UNITED STATES PATENT OFFICE

HENRY GAULLIEUR, OF NEW YORK, N. Y.

IMPROVEMENT IN PROCESSES OF PRESERVING MEATS, &c.

Specification forming part of Letters Patent No. 174,071, dated February 29, 1876; application filed February 4, 1876.

*To all whom it may concern:*

Be it known that I, HENRY GAULLIEUR, of the city, county, and State of New York, have invented certain new and useful Improvements in the Preservation of Butchers' Meat, Fish, &c., of which the following is a specification:

In the method of preparing meats, fishes, or vegetables by acetate of soda, as specified in Sacc's Letters Patent No. 169,849, experience and practical use have proved that meats prepared by that process are subject to the following disadvantages: First, the meat, before use, requires to be soaked for twenty-four hours, more or less, in a solution of water and sal ammoniac ($ClH, NH_3$.) Second, the original solution of water and acetate of soda, as specified in said patent, is costly, necessitates a subsequent evaporation of this solution in order to reclaim part of the acetate of soda. By such an evaporation no more than fifty per cent., or thereabout, of the acetate of soda can be reclaimed, and the process of evaporating is tedious and costly in cattle-producing countries. Third, the taste of acetate of soda, acquired by the meat in the solution described by Sacc, is so strong that not even the solution he recommends of water and sal ammoniac is able to take it off. Fourth, there is a loss of meat in weight produced by his process, which, as he says, reaches nearly twenty-five per cent. of the weight of the meat.

In order to obviate all these disadvantages I proceed as follows: In a suitable vessel, such as a barrel used for packing beef, and commonly called "beef-barrel," I put the meat, cut up into pieces of ten pounds, more or less. The meat should not be packed too tightly, but in the manner customary for beef-packing, *i. e.*, so as to allow interstices and spaces around and above it in the barrel, which, in order to fill the same with water, would take about twenty pounds to every hundred pounds of meat. When the barrel is thus packed I pour into the barrel a solution composed of acetate of soda and water, in the proportions of from five to ten pounds of the former to twenty pounds of the latter for every one hundred pounds of meat. Some saltpeter may be advantageously used in connection with this solution, or any other ingredients for imparting color or flavor.

Meat thus prepared has the following advantages, viz: First, it does not need to be washed or soaked, but can be cooked instantly without soaking, my solution imparting not as strong a taste of acetate of soda, and, for ships' use specially, the simple boiling of the meat is sufficient to dissolve the crystals of acetate of soda it contains. Second, it costs materially less to preserve, since, instead of twenty-five per cent. of acetate of soda, of which half may subsequently, by a tedious process, be reclaimed, I use only about ten per cent., or less, saving thus not only acetate of soda, but fuel, apparatus, and labor, &c. My invention is such as to allow the shipping of the meat the day it is put up. Third, the meat does not shrink or lose in weight at all, my solution acting as an antiseptic and without affecting the weight.

The proportions above indicated are those that I deem best adapted for the purpose, but it will be obvious that they may be somewhat changed without departure from my invention. For instance, the quantity of acetate of soda can be increased one or two per cent. without materially changing the result, the added quantity being quite superfluous, however, and, to that extent, increasing the expense of the process. On the other hand, I would remark that I believe the percentage of the acetate of soda cannot be essentially reduced below the inferior limit specified by me without decidedly affecting the success of the process, both as regards the quality and the preservation of the meat. For instance, in carrying on the process in temperate or cold climates four (4) per cent. of the acetate may suffice, but for warmer climates I do not recommend a less proportion than five (5) per cent.

The percentage of water will depend somewhat upon the size of the pieces of meat, temperature, nature of the meat, &c., but in no case will this process be as tedious and costly and injurious to the flavor of meat as the one already mentioned.

Having described my invention, what I claim, and desire to secure by Letters Patent, is—

The process of preserving butchers' meats, fish, &c., by treating the same substantially in the manner described, in a fresh or uncooked condition, with a solution of acetate of soda, prepared and used in the proportions substantially as specified.

In testimony whereof I have hereunto signed my name this 3d day of February, A. D. 1876.

H. GAULLIEUR.

Witnesses:
 A. POLLOK,
 EWELL A. DICK.